United States Patent
St-Amand et al.

(10) Patent No.: US 6,298,059 B1
(45) Date of Patent: Oct. 2, 2001

(54) MULTIPLE QUALITY OF SERVICE ASYNCHRONOUS TRANSFER MODE-FRAME RELAY INTERWORKING FUNCTION AND METHOD

(75) Inventors: Marc St-Amand, Aylmer (CA); Yvon Gilbert, Chevreuse (FR)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/219,437

(22) Filed: Dec. 23, 1998

(51) Int. Cl.[7] .............................. H04L 12/28; H04L 12/56
(52) U.S. Cl. ............................................. 370/397; 370/401
(58) Field of Search ..................... 370/397, 252, 370/352, 353, 359, 395, 399, 400, 401, 402, 409, 419, 420, 421, 437, 438, 465, 466, 467, 474, 389, 233, 536, 254, 329, 377, 230, 439, 444; 709/230, 232, 233, 238

(56) References Cited

U.S. PATENT DOCUMENTS

| | | | |
|---|---|---|---|
| 5,610,918 | * 3/1997 | Kamo et al. | 370/395 |
| 5,946,670 | * 8/1999 | Motohashi et al. | 375/400 |
| 5,963,541 | * 10/1999 | Koga et al. | 370/229 |
| 6,094,419 | * 7/2000 | Ohyoshi et al. | 370/231 |
| 6,118,759 | * 9/2000 | Ohyoshi et al. | 370/229 |
| 6,144,669 | * 11/2000 | Williams et al. | 370/401 |

OTHER PUBLICATIONS

Doug O'Leary, Bell Atlantic, "Frame Relay/ATM PVC Network Interworking Implementation Agreement", Dec. 20, 1994, pp. 1–17.

Digital Subscriber Signalling System No. 1, Network Layer, Digital Subscriber Signalling System No. 1 (DSS 1)—Signalling Specification for Frame Mode Basic Call Control, ITU–T Recommendation Q. 933, Mar. 1993, pp. 1–71.

Integrated Services Digital Network (ISDN), Internetwork Interfaces, Frame Relaying Bearer Service Interworking, ITU–T Recommendation I.555, Nov. 1993, pp. 1–18.

* cited by examiner

*Primary Examiner*—Douglas Olms
*Assistant Examiner*—Phirin Sam (57) ABSTRACT

A system and method for interworking between FR (frame relay) and ATM (asynchronous transfer mode) using permanent virtual circuits. An ATM VCC between two interworking functions is dedicated to FR LMI signalling traffic, while the FR data traffic is carried by ATM VCCs which do not carry any FR LMI signalling traffic. The FR data traffic of a given FR DLCI is carried by an ATM VCC having a service category and bandwidth parameters which reflect the transfer priority and bandwidth needs of the particular FR DLCI. This allows a high priority to be assigned to all LMI traffic carried over the ATM network independent of the priority assigned to the FR data traffic.

10 Claims, 10 Drawing Sheets

MULTIPLE QUALITY OF SERVICE ASYNCHRONOUS TRANSFER MODE-FRAME RELAY INTERWORKING FUNCTION AND METHOD

FIELD OF THE INVENTION

The invention relates to functions and methods for interworking frame relay with asynchronous transfer mode and more particularly to methods and functions which do so using multiple qualities of service.

BACKGROUND OF THE INVENTION

In FR (frame relay), data is sent in packets which have a two byte header and have a variable size data section (payload) which ranges in size from two to 8187 bytes. FR is connection oriented, with each packet including a connection identifier, the packets of a given connection constituting a logical frame relay connection. Each FR logical connection is identified by a DLCI (data link connection identifier). Currently, DLCIs range from 0 to 1023 with DLCI-16 through DLCI-1007 allocated for data connections. Typically, DLCI-0 is reserved to function as a signalling connection. This connection is used to set up new logical connections for example.

Between two FR switching elements there is a capability of assigning a transfer priority to each connection typically in the range of 0 to 15. FR messages include C-plane messages which are used for signalling, and U-plane messages which are used for data, the C-plane messages requiring a higher priority than U-plane messages. Between two FR switching elements high priority LMI (local management interface) C-plane messages are used to implement a handshaking protocol. This high priority assigned to LMI traffic thereby ensures that essential signalling information can get through the network notwithstanding congestion which may otherwise exist.

In ATM, data is sent in cells which have a fixed size 53 bytes including a five byte header. ATM is also connection oriented with ATM cells being carried in VCCs (virtual channel connections). One VCC represents one connection in much the same way that one DLCI represents one FR connection. Each VCC has a QoS (quality of service). The QoS's presently defined include CBR (constant bit rate) typically used for voice, VBR-rt (variable bit rate—real-time) used for real-time sensitive services, VBR—non-real-time used for services which are not real-time sensitive, UBR (unspecified bit rate) used for low priority traffic, and ABR (available bit rate) which has recently been introduced. The QoS for a VCC is fixed across all DLCIs carried over the VCC.

There needs to be the capability to connect FR devices to ATM devices and vice versa, and this capability is usually implemented by some kind of IWF (interworking function). At an IWF, this has consisted of some sort of mapping between VCCs, and incoming/outgoing logical frame relay connections (DLCIs).

Two existing FR-ATM interworking solutions adhere to two schemes of multiplexing presented in ITU-T recommendation I.555. There is also a solution proposed by FRF.5 which builds upon that of ITU-T I.555. In all of these solutions, control/signalling information is carried with no distinction from data across each ATM connection. In other words, the ATM network gives the same priority to signalling messages as to the data itself.

Historically, FR has been thought of as being applicable to non-real time applications, and as being most suitably carried by ATM VBR-nrt. Since signalling packets can be expected to satisfy VBR-nrt behaviour and the data can also be modelled as VBR-nrt, the above problem of giving the same priority to signalling as data has not been significant. However, now real-time applications for FR exist, for example voice over FR, in which case it would be useful to be able to carry FR traffic with different QoS and still be able to reliably transmit control/signalling information. The existing solutions do not permit this. If for example, the ATM UBR service is used for the data and control it is likely that some packets will be lost. While this may not be serious if a regular data packet gets lost, it is a problem if control and signalling information is not getting through reliably.

SUMMARY OF THE INVENTION

It is an object of the invention to obviate or mitigate one or more of the above identified disadvantages.

A system and method for interworking between FR (frame relay) and ATM (asynchronous transfer mode) using permanent virtual circuits are provided. An ATM VCC between two interworking functions is dedicated to FR LMI signalling traffic, while the FR data traffic is carried by ATM VCCs which do not carry any FR LMI signalling traffic. The FR data traffic of a given FR DLCI is carried by an ATM VCC having a service category and bandwidth parameters which reflect the transfer priority and bandwidth needs of the particular FR DLCI. This allows a high priority to be assigned to all LMI traffic carried over the ATM network independent of the priority assigned to the FR data traffic.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
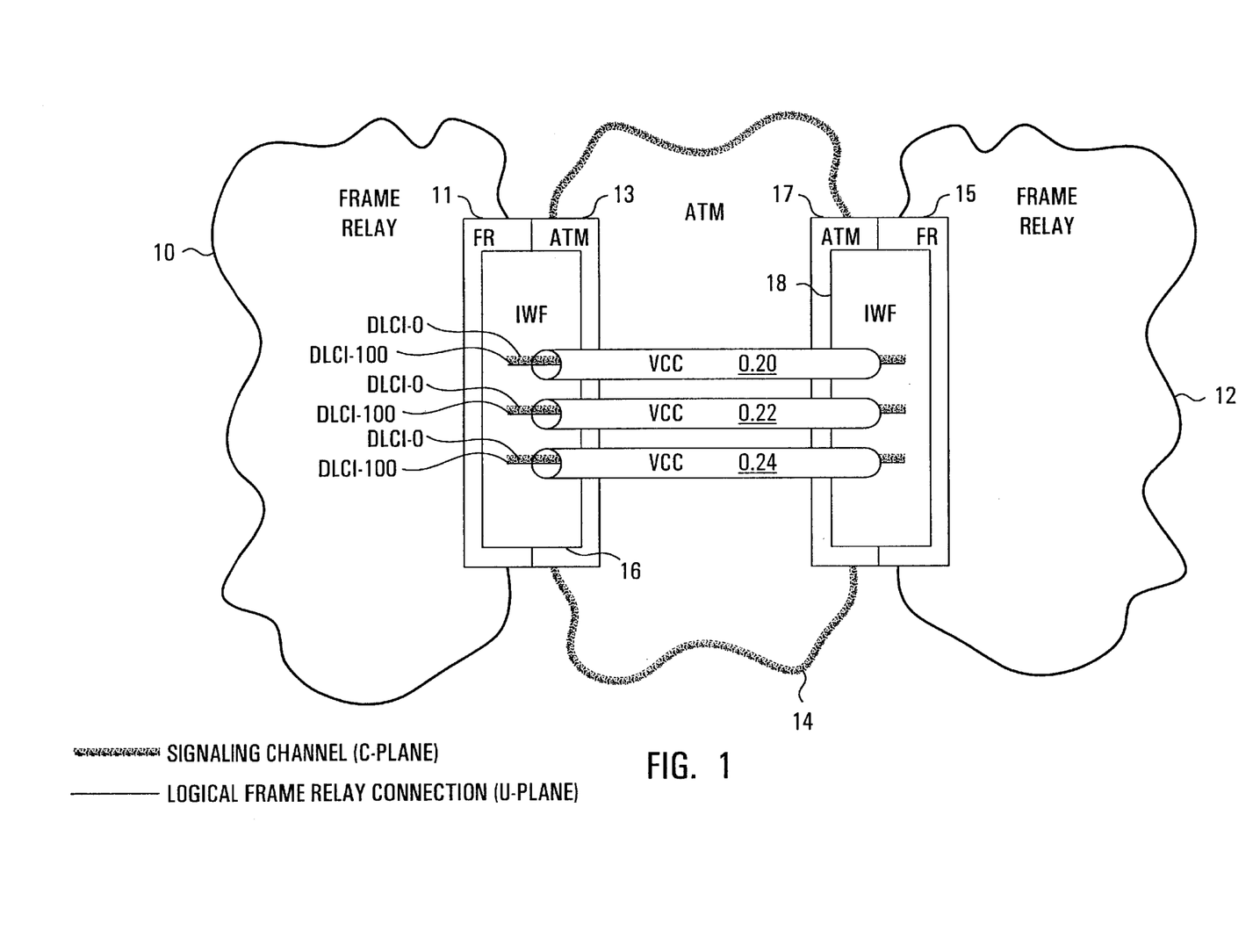
FIGS. 1–3 are schematic diagrams of conventional FR-ATM interworking solutions.
Figure 2:
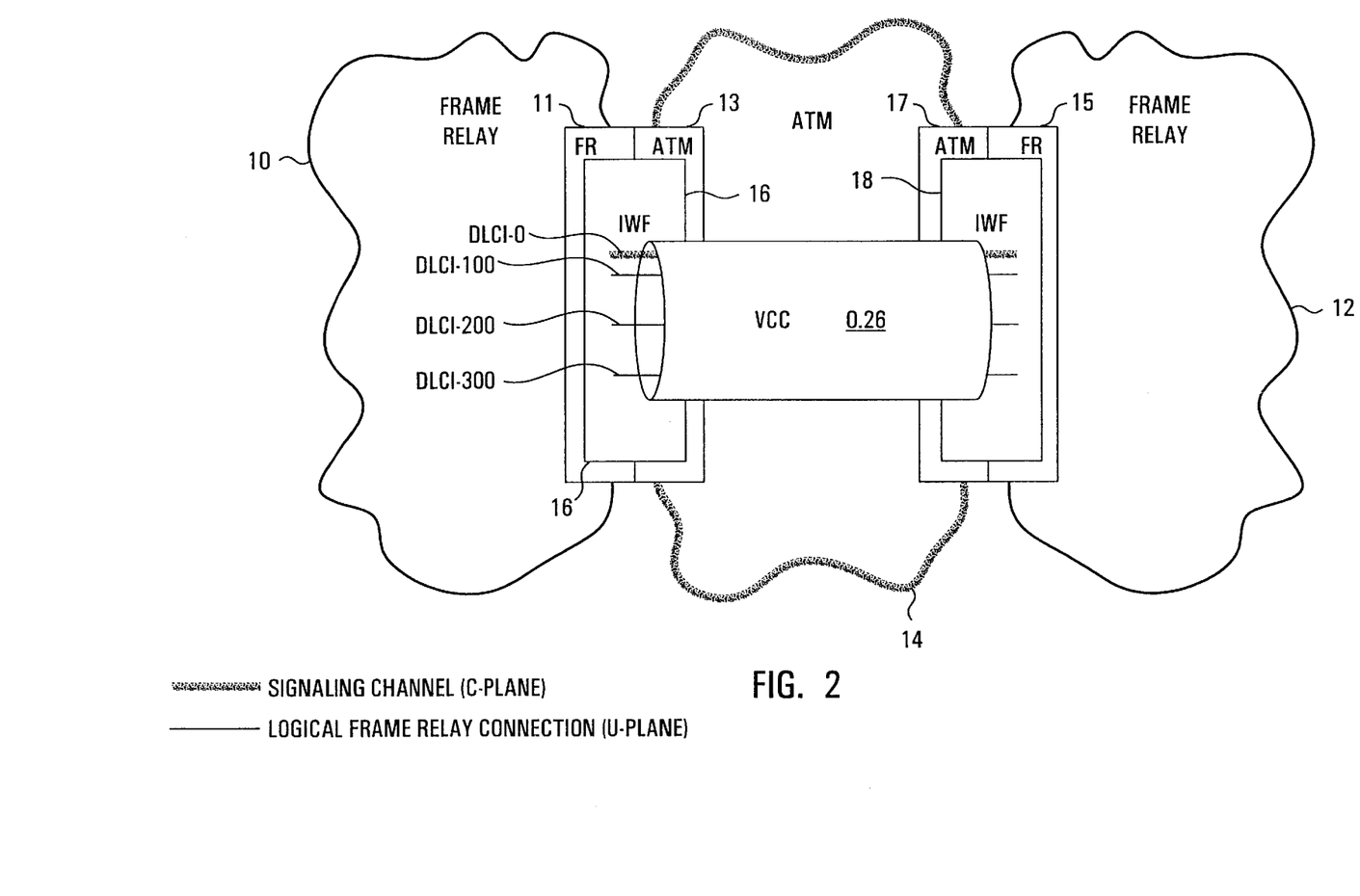

Firstly, three existing FR-ATM interworking solutions will be described with reference to FIGS. 1, 2 and 3.

In one of the existing FR-ATM network interworking solutions which adhere to ITU-T recommendation I.555, each logical FR connection is mapped to a respective DLCI in a single ATM VCC, and a respective DLCI-0 in each VCC is used to convey LMI traffic relating to that logical FR connection. Multiplexing is accomplished at the ATM layer using VCC identifiers (vpi.vpi). This is referred to as one-to-one interworking. This solution is illustrated schematically in FIG. 1. Two FR networks are represented by clouds 10,12, and an ATM network is indicated by cloud 14. At the interfaces between the FR networks and the ATM network are IWFs (inter-working functions) 16,18. The IWF 16 interworks between a near end FR node 11 and a near end ATM node 13 which may be on a single piece of hardware for example. Similarly, the far end IWF 18 interworks between a far end ATM node 17 and a far end FR node 15. The IWFs are not typically separate devices or functions from those provided by the ATM or FR nodes, but rather consist of enhancements and changes which permit a desired interworking to be achieved. Throughout this description the reference numbers for VCCs will be in the form 0.n, as this is how VCC identifiers are normally expressed. For the purpose of example, there are three logical FR connections which are carried through the ATM network on a DLCI-100 through a first VCC 0.20, a DLCI-100 through a second VCC 0.22, and a DLCI-100 through a third VCC 0.24. Also shown is a DLCI-0 on each of VCC 0.20,0.22,0.24 for carrying LMI traffic relating to the three logical FR connections. This scheme addresses the issue of FR to ATM QoS mapping. Each logical FR connection with its own transfer priority is mapped to one ATM VCC with a corresponding service category. The mapping between FR transfer priority and ATM service category is basically arbitrary. For example, transfer priority 15 might be mapped to CBR, transfer priorities 9,6 might be mapped to VBR-rt, and transfer priority 3 might be mapped to VBR-nrt. The remaining transfer priorities mapped to UBR. The transfer priority for LMI signalling relating to a particular data connection is necessarily mapped to the same ATM service category as the data connection it relates to since it is carried on the same VCC. Unfortunately, this interworking is achieved with a significant overhead, since there must be one signalling channel per logical connection.

In another existing FR-ATM network interworking solution which also adheres to the ITU-T recommendation I.555, a number of logical FR connections are multiplexed into a single ATM VCC. Multiplexing is accomplished at the FR-SSCS (service specific convergence sublayer) sublayer using DLCIs. This is many-to-one interworking. An example of this is illustrated schematically in FIG. 2 in which three logical FR connections are mapped to DLCI-100, DLCI-200, and DLCI-300 of a single VCC 0.26. In addition, a single DLCI-0 carries all signalling information over the same VCC 0.26. This solution somewhat reduces the amount of signalling overhead.

Figure 3:
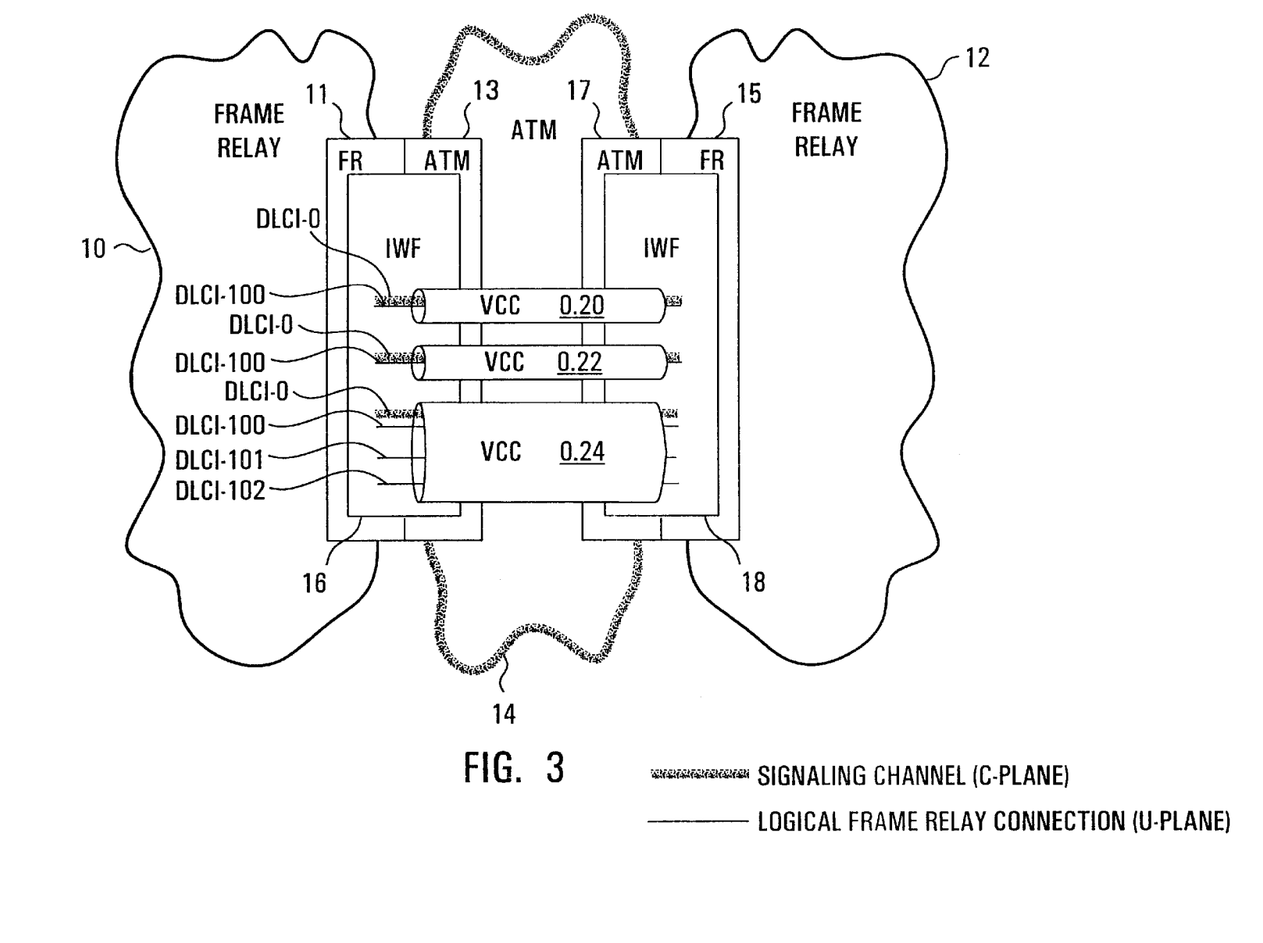

By combining the two above solutions, one arrives at the FRF.5 network interworking function which is illustrated schematically by way of example in FIG. 3. In the illustrated example, there are five logical FR connections which are to be carried over three ATM "FRF.5 connections" (i.e. three VCCs) between two IWFs, and the connections are identified as DLCI-100 carried over VCC 0.20, DLCI-100 over VCC 0.22, DLCI-100 over VCC 0.24, DLCI-101 over VCC 0.24, and DLCI-102 over VCC 0.24. In addition, according to FRF.5, LMI messages are exchanged over a respective DLCI-0 of every ATM VCC associated with the network interworking function. In the illustrated example, there is a respective DLCI-0 over each of the VCCs 0.20,0.22,0.24 which carries signalling information in relation to all of the logical FR connections of the respective VCC. It can be seen that the DLCIs associated with each logical FR connection may not be unique, in this case DLCI-100 being associated with three different logical FR connections. According to this proposal, there may be one-to-one mapping as used over VCCs 0.20,0.22 and there may be many-to-one mapping as used over VCC 0.24. In setting up traffic parameters according to the FRF.5 solution, no account is made for LMI traffic.

In all of the above described solutions, control/signalling information is carried with no distinction from data across each ATM connection. In other words, the ATM network gives the same priority to signalling messages as to the data itself.

A FR-ATM interworking solution according to an embodiment of the invention employs one dedicated ATM VCC to carry a FR interworking signalling channel and employs one-to-one or many-to-one mapping of logical FR connections within a pair of extended "logical" interworking functions. In other words, a dedicated signalling channel controls a number of logical FR connections, carried on one or several distinct ATM VCCs. Multiplexing is accomplished at the ATM layer using vpi.vci's and at the FR-SSCS sublayer using a unique DLCI for each connection within the logical interworking function.

Figure 4:
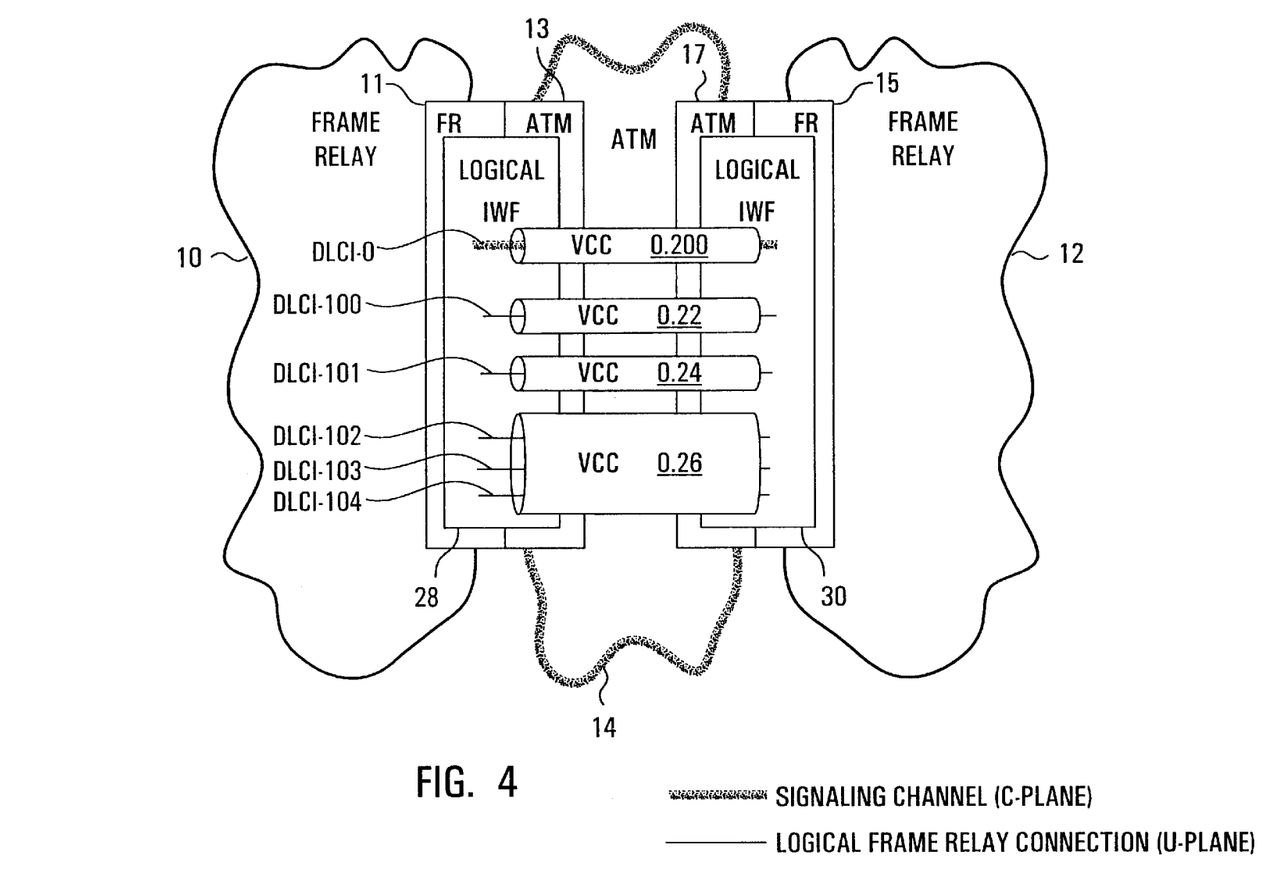
FIGS. 4–8 are schematic diagrams of FR-ATM interworking solutions according to embodiments of the invention.

An example of this is shown in FIG. 4 where the logical IWFs provided by an embodiment of the invention are indicated by 28,30 and it is assumed that there are five logical FR connections. All the signalling for all five logical FR connections is carried on a DLCI-0 assigned to a dedicated VCC 0.200. The five logical FR connections are carried over VCCs 0.22,0.24,0.26 in both one-to-one fashion as in VCCs 0.22,0.24 where DLCI-100 on VCC 0.22 identifies a first logical FR connection and DLCI-101 on VCC 0.24 identifies a second logical FR connection, and in many-to-one fashion as in VCC 0.26 where DLCI-102, DLCI-103 and DLCI-104 identify third, fourth and fifth logical FR connections.

Preferably, the ATM VCC dedicated to the exchange of signalling/LMI messages uses the ATM QoS VBR-nrt. Its traffic parameters including peak cell rate, sustained cell rate and maximum burst rate may be determined by examining LMI traffic characteristics. For example, the ATM sustained cell rate may be modelled as the capacity required to carry normal 12 octet FR status enquiry/status reply exchanges which are made every T391 seconds (T391 is an LMI provisionable parameter). Using worst case (T391=1 second) full status replies for the full usable range of DLCIs (16–1007) this yields a single 12 octet status enquiry requiring a single ATM cell, and a status reply having a 12 byte header and 5 bytes of status for each of the 992 DLCIs. Together, these require approximately 104 ATM cells. Thus a conservative SCR would be 105 cells/second, while a more aggressive SCR would be 105/T391 cells/sec. The peak cell rate can be modelled as capacity required to carry FR 13 octet asynchronous status reports. Supposing all DLCIs fire an asynchronous status report simultaneously, the PCR would be the above identified SCR plus 13*992 octets/sec= SCR+992 cells/second. Finally, the maximum burst size may be calculated on the basis of all asynchronous, enquiry and reply messages happening at once in which case MBS= PCR*1 second.

It is noted that during the initial configuration of the ATM network, a number of VCCs between the IWFs must be provisioned instead of only one. The number required will depend upon the number of different QoS's to be supported, and on whether one-to-one and/or many-to-one mapping is to be employed.

Additional examples will now be described with reference to FIGS. 5–8. In each of these examples, there are clouds 10,12 for the FR network, cloud 14 for the ATM network, and two logical IWFs 28,30 according to an embodiment of the invention. In the example of FIG. 8, there are four logical IWFs 28,30,36,38.

Figure 5:
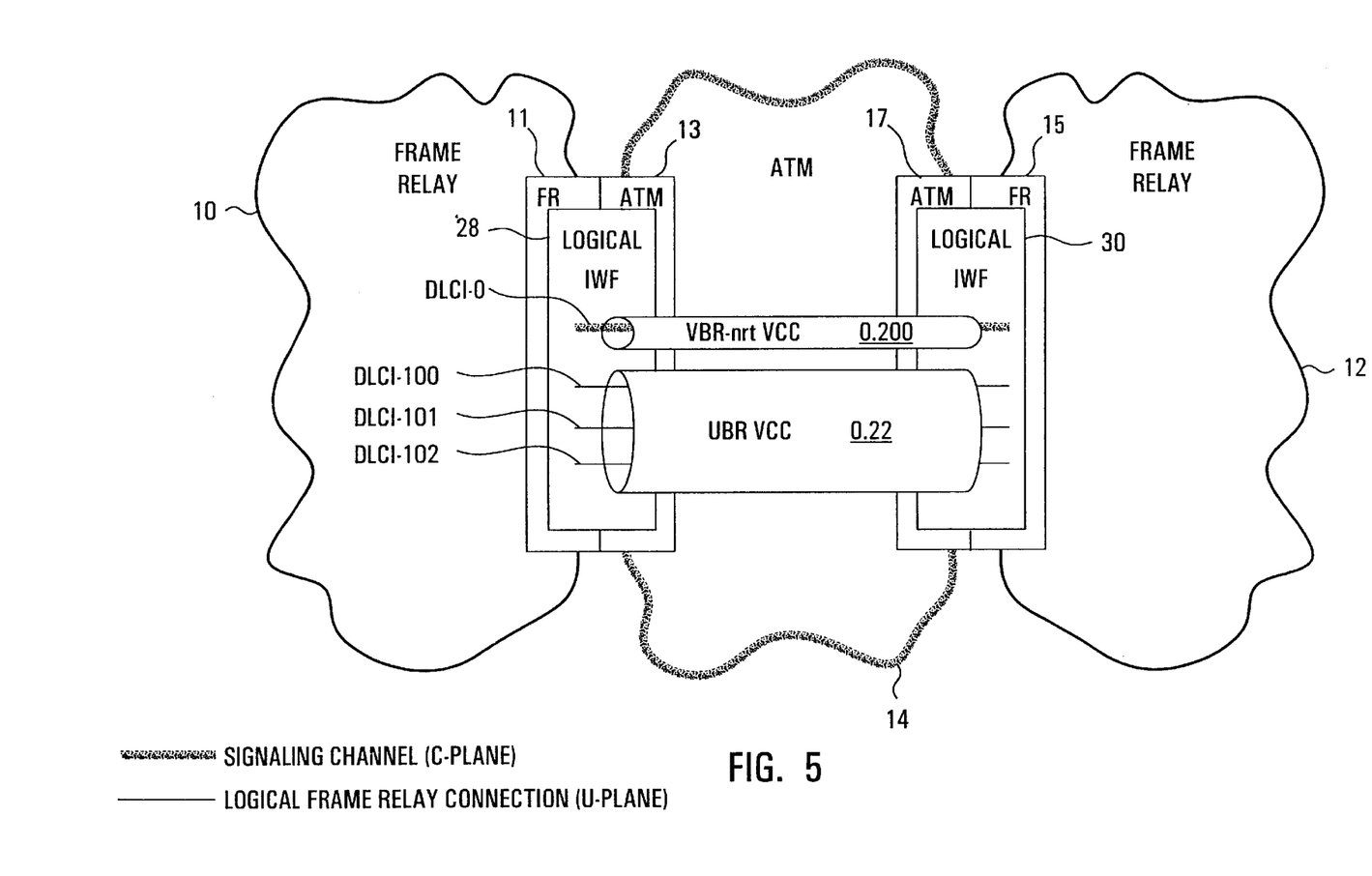

Referring firstly to FIG. 5, in this example, there are three FR logical connections all of which share the same transfer priority which happens to be low. According to the above exemplified service mappings, this maps to the UBR ATM QoS. Thus, the logical IWFs 28,30 in this case maintain a total of two ATM VCCs, namely VCC 0.200 which handles the signalling messages using the VBR-nrt ATM QoS, and VCC 0.22 which multiplexes all three logical connections DLCI-100, DLCI-101, DLCI-102 using the UBR service category. This example features single transfer priority, many-to-one multiplexing.

Figure 6:
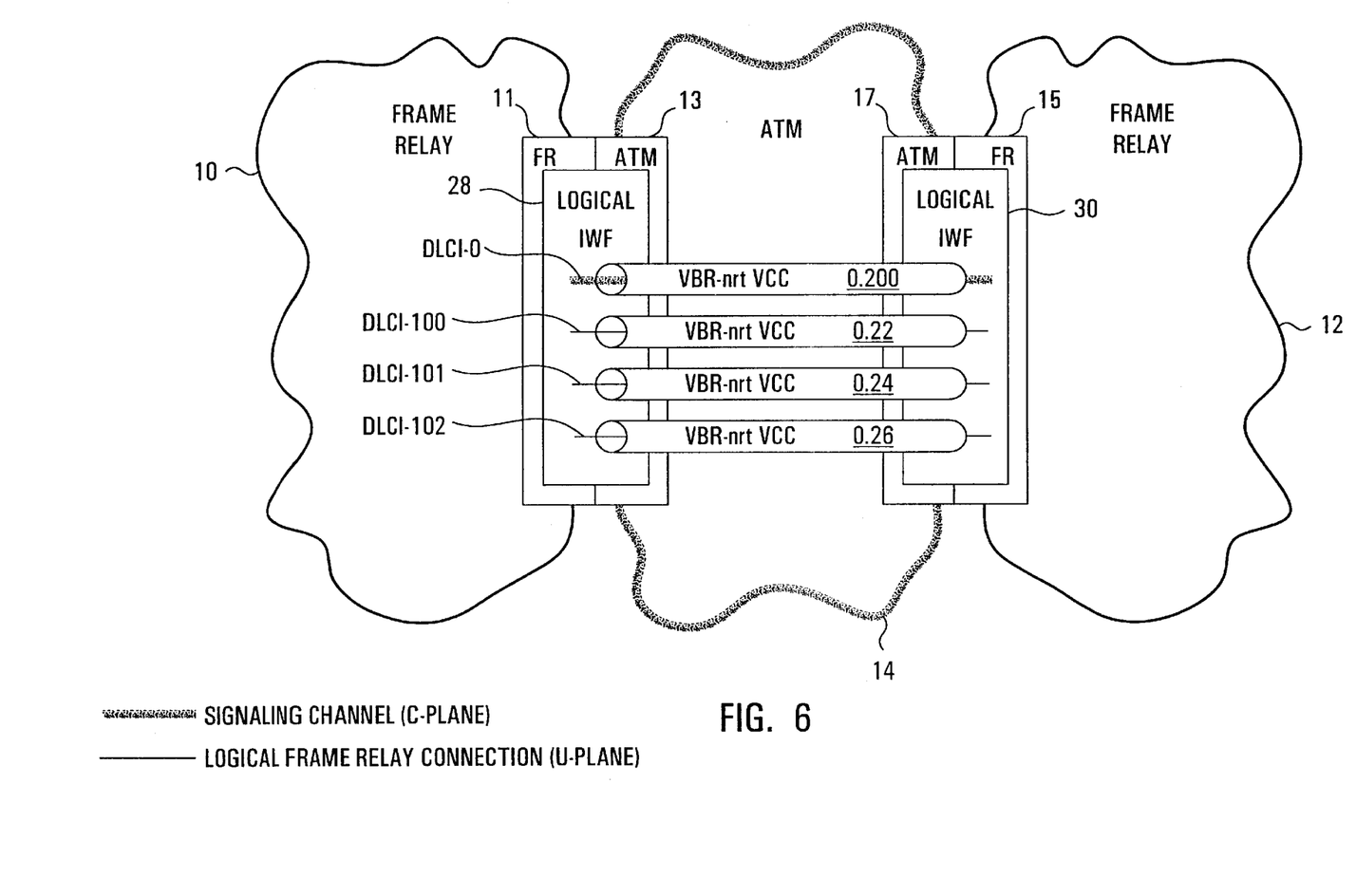

Referring next to FIG. 6, in this example, there are three FR logical connections all of which share the same transfer priority which happens to be map to the VBR-nrt ATM QoS. In this example, the logical IWFs 28,30 maintain a total of four ATM VCCs, namely VCC 0.200 which handles the signalling messages using the VBR-nrt ATM QoS, and three VCCs 0.22,0.24,0.26 which each handle one of the logical connections DLCI-100, DLCI-101, DLCI-102 also using the VBR-nrt service category. Since the FR-SSCS DLCI number is unique for each FR logical connection, one signalling channel can maintain several one-to-one multiplexings. This example features a single transfer priority, and one-to-one multiplexing. The choice of one-to-one or many-to-one multiplexing is decided at provisioning time by a network operator and is completely arbitrary.

Figure 7:
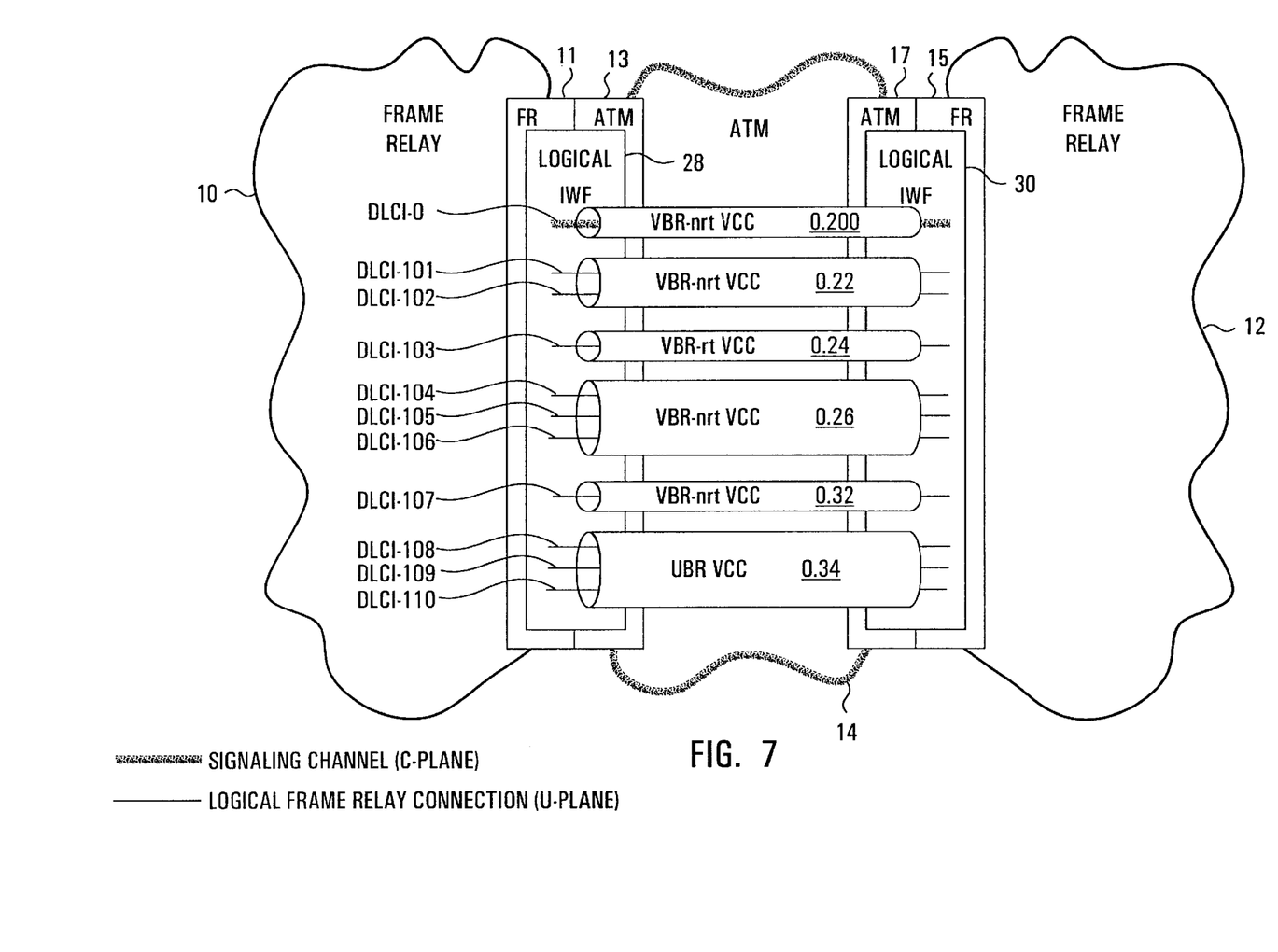
Figure 8:
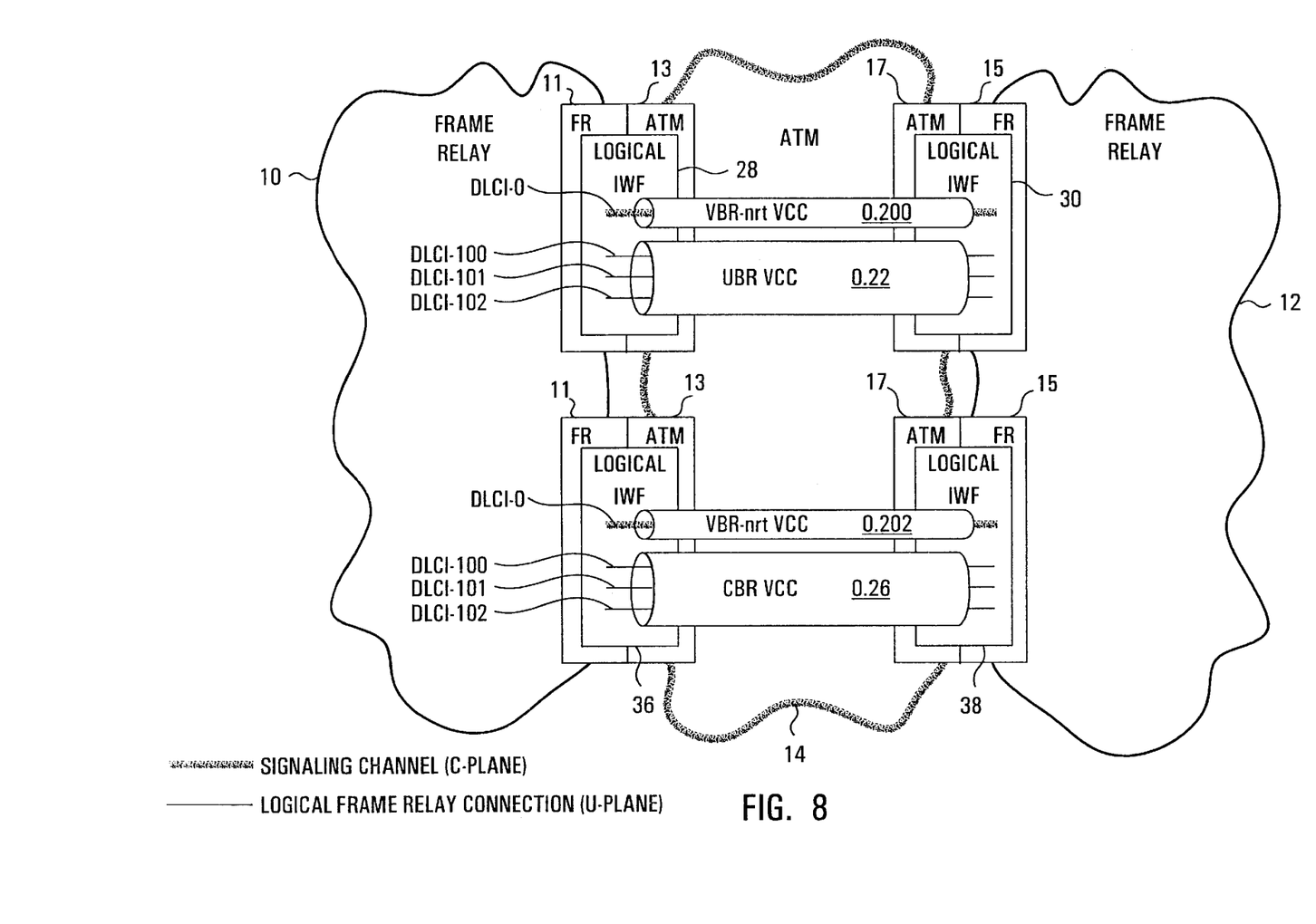

Referring now to FIG. 7, in this example, there are ten FR logical connections which are assigned several different transfer priorities. Two of these map to CBR and are carried over VCC 0.22 on DLCI-101, DLCI-102, another maps to VBR-rt and is carried over VCC 0.24 on DLCI-103, another four map to VBR-nrt three of which are carried over VCC 0.26 on DLCI-104, DLCI-105, DLCI-106 and one of which is carried over VCC 0.32 on DLCI-107, another three map to UBR and are carried over VCC 0.34 on DLCI-108, DLCI-109, and DLCI-110. Once again, a single dedicated VCC 0.200 carries all signalling information with ATM QoS VBR-nrt. This example includes multiple transfer priorities, many-to-one and one-to-one multiplexing.

There may be more than one pair of logical IWFs 28,30 each handling a respective group of logical FR connections. In such case, for FR signalling relating to all the logical FR connections carried through one logical IWF, a separate dedicated ATM VCC is allocated. An example of this is shown in FIG. 8. In this example, there are three logical FR connections carried between logical IWFs 28,30 each with transfer priorities mapping to the ATM QoS UBR. These are carried over a single VCC 0.22 on DLCI-100, DLCI-101, DLCI-102, and DLCI-0 of a VCC 0.200 is used for signalling information for those logical connections. In addition, there are three logical FR connections carried between logical IWFs 36,38 each with transfer priorities mapping to the ATM QoS CBR. These are carried over a single VCC 0.26 as DLCI-100, DLCI-101, DLCI-102, and DLCI-0 of another VCC 0.202 is used for signalling information for those logical connections. Of course the pairs of IWFs may in fact span different ATM networks and/or end up in different FR networks.

The above described embodiment provides a dedicated FR signalling channel between IWFs connected together by ATM for use with provisioned VCCs (PVCs). In other words, the signalling channel, and one or more traffic VCCs are provisioned, and "hard-wired" FR connections are routed through these VCCs as described above.

All of the above discussed configurations are chosen and put in place by the network operator at provisioning (i.e. network setup) time. They are completely static, and any change is made by the network operator whenever it is deemed necessary. For example, a new DLCI can be added to an existing VCC on an existing logical IWF; a new DLCI can be added on a new VCC on an existing logical IWF, etc. The LMI is consistently used to signal such new connections.

Figure 9:
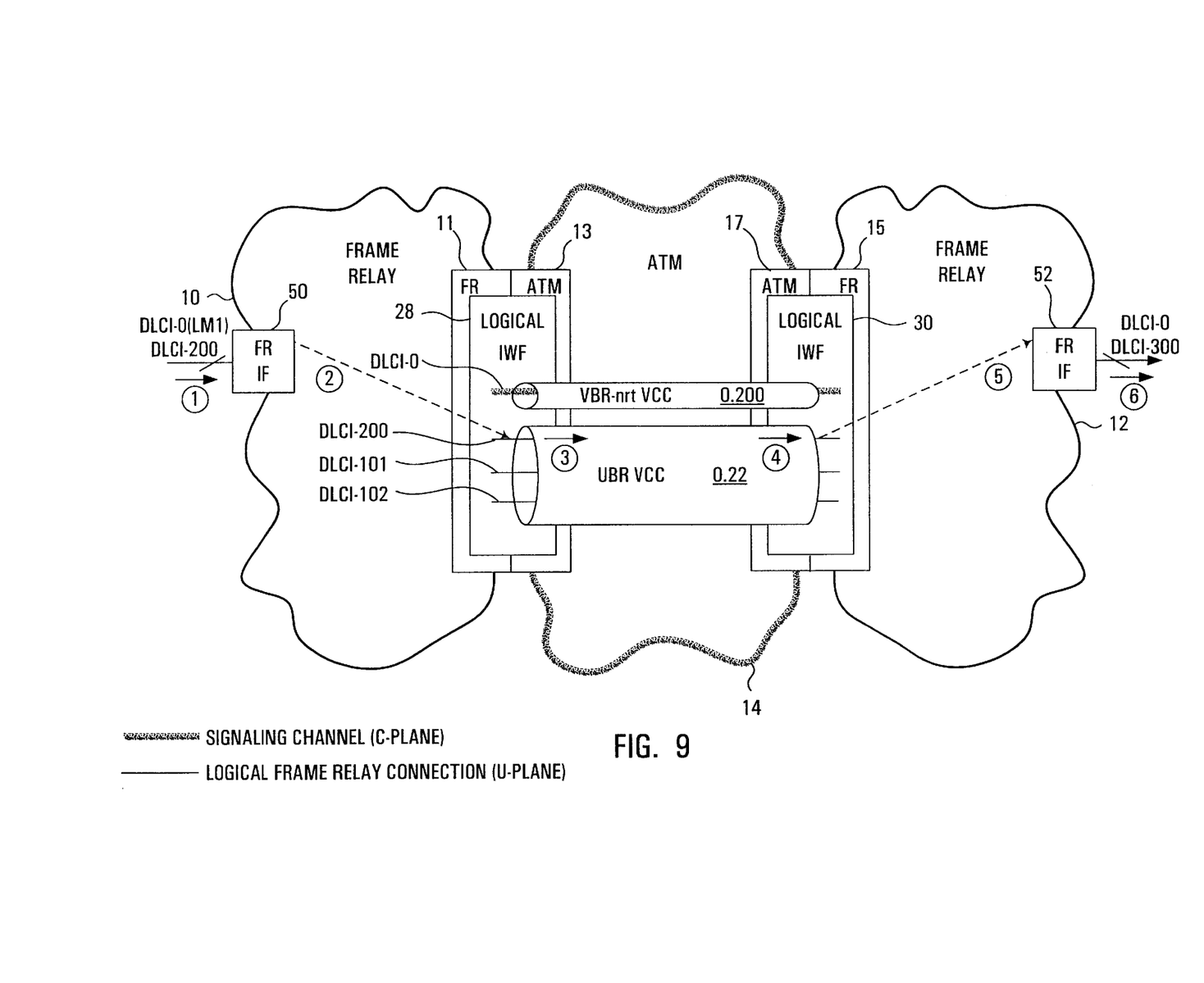
FIG. 9 is an example data path message flow.

Of course, the actual data transfer that happens between the IWFs is dynamic. For the purpose of illustration, the data path is shown in FIG. 9 with egress and ingress FR interfaces 50,52 at the edges of the FR networks. Data path steps are indicated by arrows with small numbered circles.

At step 1, a frame comes in the FR interface 50 for DLCI 200 on an HDLC link. In step 2, the internal multiplexing table in FR interface 50 forwards the frame to logical IWF 28 on DLCI 100 as per static PVC configuration. In step 3 the logical IWF 28 receives the frame for DLCI 100, segments it into ATM cells, and sends them through ATM VCC 0.22. Of course there may be other well understood steps which are taken here such as AAL5 encapsulation, and these will not be described here. There are known FR over ATM conversion circuitries for performing such steps. In step 4, logical IWF 30 gets the cells and reassembles the frame. In step 5, the logical IWF 30 maps DLCI 100 frame to FR interface 52, DLCI 300 through internal multiplexing table as per static PVC configuration and outputs the frame. Finally, in step 6, the FR interface 52 receives the frame for DLCI-300 and sends it out onto an HDLC link.

Figure 10:
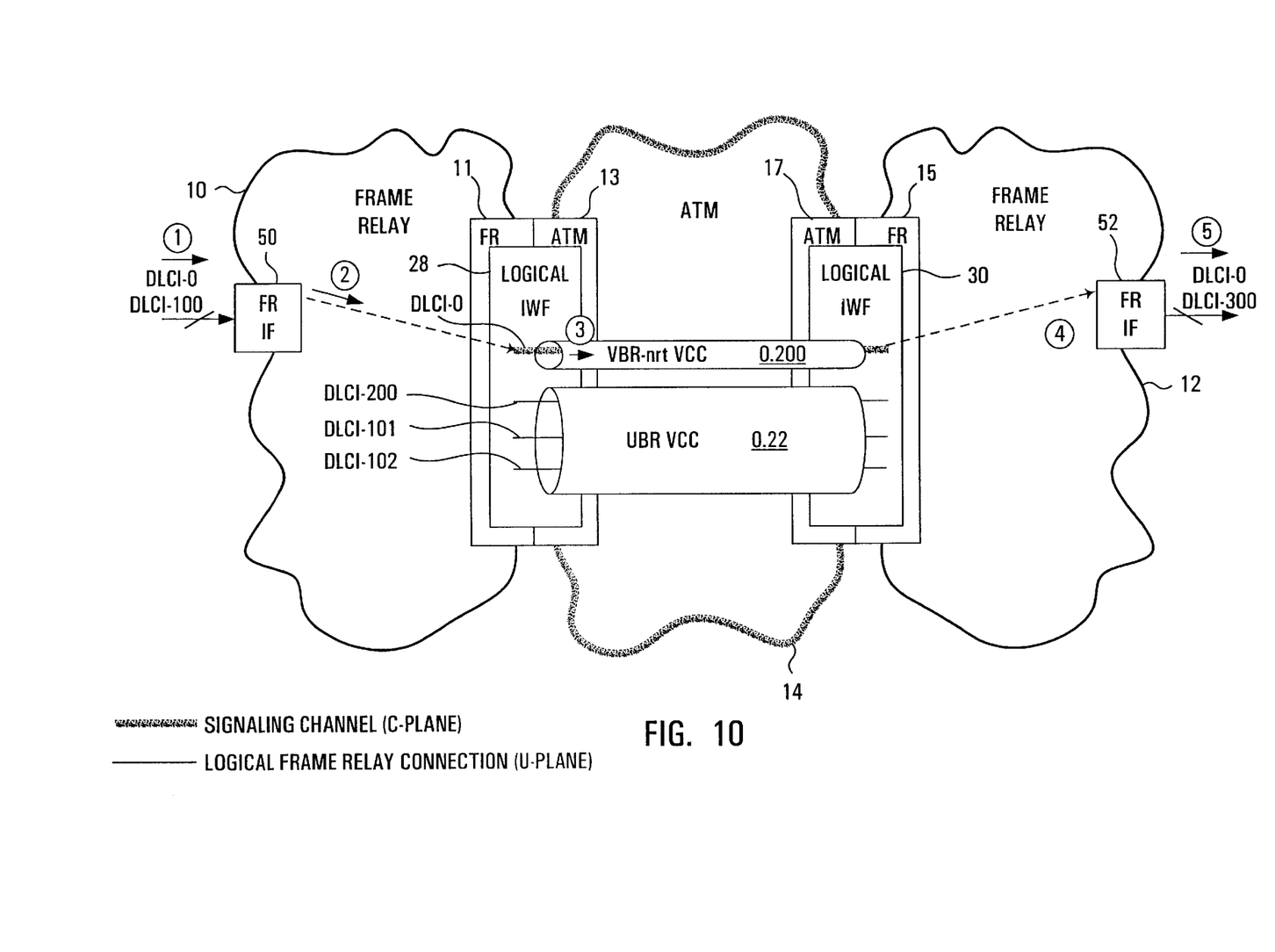
FIG. 10 is an example signal path message flow.

The relaying of PVC status information on the LMI channels is also dynamic as shown in FIG. 10 which will now be briefly described. In step 1, FR interface 50 receives an LMI status report on DLCI 0 indicating a status change for DLCI 100 (for example new→deleted or vice versa; active→inactive or vice versa). In step 2, a multiplexing table in FR interface 50 maps DLCI-100 to logical IWF 28, DLCI-200. The status change for DLCI-200 is sent to IWF 28. In step 3, the logical IWF 28 receives the status change message, forwards (segmented into cells) onto the signalling channel VCC 0.200, DLCI-0 as an LMI message. Logical IWF 30 receives the ATM cells and reassembles the LMI frame and reads the status message for DLCI-200. The multiplexing table in logical IWF 30 maps DLCI-200 to FR interface 52, DLCI-300, and logical IWF 30 forwards the status change message there. The FR interface 52 receives the status change message for DLCI-300, and forwards it on DLCI-0 (LMI) of its HDLC link.

Numerous modifications and variations of the present invention are possible in light of the above teachings. It is therefore to be understood that within the scope of the appended claims, the invention may be practised otherwise than as specifically described herein.

The above described embodiments have focussed on interworking methods and systems to interwork between ATM and FR networks. Of course, more generally, the method may be applied to interwork between a first network having a first native protocol, and a second network having a second native protocol for implementation by a near end IWF function located at an interface between the two networks. In such an application, each logical data connection incoming from the first network is mapped to one of one or more data connections between the near end IWF and the far end IWF. In addition, all control/signalling messages relating to the logical connections incoming from said first network are mapped to a dedicated signalling connection between the near end IWF and the far end IWF.

The embodiments of the invention in which an exclusive property or privilege is claimed are defined as follows:

1. A method of interworking between a first network having a first native protocol, and a second network having a second native protocol for implementation by a near end IWF (interworking function) located at an interface between the two networks, the method comprising:

mapping each logical data connection incoming from the first network to one of one or more data connections between the near end IWF and a far end IWF;

mapping all control/signalling messages relating to the logical connections incoming from said first network to a dedicated signalling connection between the near end IWF and the far end IWF.

2. A method according to claim 1 further comprising the steps of: provisioning said one or more data connections between the near end IWF and the far end IWF; and provisioning said dedicated signalling connection between the near end IWF and a far end IWF.

3. A method according to claim 1 wherein the first network is a FR (frame relay) network and the second network is an ATM (asynchronous transfer mode) network, and said dedicated signalling channel is a first ATM VCC, and each of said data connections is another ATM VCC.

4. A method according to claim 3 wherein:

said step of mapping each logical data connection comprises mapping each of the logical data connections to a respective unique DLCIs on one or more ATM VCCs between the two interworking functions;

said step of mapping all control/signalling messages relating to the logical connections comprises mapping these messages to a single ATM VCC between the two interworking functions not used for any of the logical connections.

5. A method according to claim 1 wherein each incoming logical connection is mapped to a unique data connection.

6. A method according to claim 3 wherein the control/signalling messages are mapped to DLCI-0 of said first ATM VCC.

7. A method according to claim 2 wherein dedicated signalling connection has ATM QoS VBR-nrt {variable bit rate—non-real time).

8. A method according to claim 2 further comprising the steps of:

mapping a transfer priority of each FR logical connection to a respective ATM QoS (quality of service};

mapping all FR logical connections having transfer priorities mapped to the same ATM QoS to one or more ATM VCCs between two ATM interworking functions with that ATM QoS, with each FR logical connection mapped to a unique DLCI; and mapping all control/signalling information relating to the plurality of FR logical connections to a single ATM VCC between the two interworking functions not used for any of the FR logical connections.

9. A method according to claim 1 further comprising the steps of:

mapping connection characteristics of each incoming logical connection to respective connection characteristics on said second network;

mapping all incoming logical connections having connection characteristics mapped to the same second network connection characteristics to one or more data connections between two interworking functions having those second network connection characteristics.

10. An ATM-FR switching node comprising:

an FR switch for receiving and sending frame relay frames over a frame relay an ATM switch for receiving and sending ATM cells over an ATM network;

a DLCI in-out mapping which maps data DLCIs incoming from the frame relay network to DLCIs assigned to ATM VCCs on the ATM network; and which identifies a dedicated signalling ATM VCC for carrying FR LMI (local management interface) frames; and FR over ATM conversion circuitry for taking incoming FR frames and generating ATM cells, with each ATM cell containing a first vci.vpi of the assigned ATM VCC in the case that the FR frame is a data frame, and with each ATM cell containing a second vci.vpi of the dedicated signalling VCC in the case the FR frame is an LMI frame;

FR frame regeneration circuitry for taking incoming ATM cells from the assigned VCCs and the dedicated VCC and regenerating FR data frames and LMI frames as appropriate.

* * * * *